(12) United States Patent
Su et al.

(10) Patent No.: US 11,472,997 B1
(45) Date of Patent: Oct. 18, 2022

(54) TEMPERATURE-RESPONSIVE SELF-DEGRADABLE TEMPORARY PLUGGING AGENT AND PREPARATION METHOD THEREOF AS WELL AS ITS APPLICATION IN PLUGGING THE WELLBORE

(71) Applicant: Yangtze University, Jingzhou (CN)

(72) Inventors: Gaoshen Su, Jingzhou (CN); Huan Yang, Jingzhou (CN); Xiaorong Yu, Jingzhou (CN); Qiang Li, Jingzhou (CN); Wenchuan Wu, Jingzhou (CN); Jieqiong Cheng, Jingzhou (CN); Chunyuan Wu, Jingzhou (CN); Zhixue Huang, Jingzhou (CN)

(73) Assignee: Yangtze University, Jingzhou (CN)

( * ) Notice: Subject to any disclaimer, the term of this patent is extended or adjusted under 35 U.S.C. 154(b) by 0 days.

(21) Appl. No.: 17/412,749

(22) Filed: Aug. 26, 2021

(30) Foreign Application Priority Data

Apr. 15, 2021 (CN) .......................... 202110405467.4

(51) Int. Cl.
*C09K 8/42* (2006.01)
*C09K 8/44* (2006.01)

(52) U.S. Cl.
CPC ................ *C09K 8/426* (2013.01); *C09K 8/44* (2013.01)

(58) Field of Classification Search
CPC .................................. C09K 8/426; C09K 8/44
See application file for complete search history.

(56) References Cited

U.S. PATENT DOCUMENTS

2016/0017079 A1* 1/2016 Rodrigues ................. C08L 3/02
526/318.41

* cited by examiner

Primary Examiner — Crystal J. Lee
(74) Attorney, Agent, or Firm — Parsons Behle & Latimer

(57) ABSTRACT

The present disclosure provides a temperature-responsive self-degradable temporary plugging agent and a preparation method thereof as well as its application in plugging the wellbore, which relates to the technical field of oilfield exploitation. The temporary plugging agent provided in the present disclosure includes preparation raw materials of the following mass percentages: monomer 4-6%, crosslinker 0.2-1%, initiator 0.02-0.06%, degradation catalyst 0.05-0.1%, chain transfer agent 0.01-0.05%, and the balance water. The temporary plugging agent of the present disclosure is liquid before gelling, with a low viscosity and a good fluidity, and easy to be pumped. When being pumped into the wellbore, the temporary plugging agent may crosslink at the temperature of the reservoir section, with good gelling properties. At the end of the operations, it can be degraded by itself, without drilling tools, with no need for gel breaking, and with no need for additional degradation promoters.

17 Claims, 2 Drawing Sheets

TEMPERATURE-RESPONSIVE SELF-DEGRADABLE TEMPORARY PLUGGING AGENT AND PREPARATION METHOD THEREOF AS WELL AS ITS APPLICATION IN PLUGGING THE WELLBORE

CROSS REFERENCE TO RELATED APPLICATION(S)

This patent application claims the benefit and priority of Chinese Patent Application No. 202110405467.4, filed on Apr. 15, 2021, the disclosure of which is incorporated by reference herein in its entirety as part of the present application.

TECHNICAL FIELD

The present disclosure relates to the technical field of oilfield exploitation, and specifically relates to a temperature-responsive self-degradable temporary plugging agent and a preparation method thereof as well as its application in plugging the wellbore.

BACKGROUND ART

In the development of oil-gas field, foam-assisted oxygen reduction air drive has provided great help in enhancing oil recovery. However, the problem of tripping pipe string in injection wells has become increasingly prominent. The period of pressure relief operations is long while the risk is high, the cost of snubbing operations is high, and there are few operation teams. Therefore, mechanical tools such as bridge plugs and packers needed to be used for plugging the wellbore or part of the casing-tubing annulus. However, mechanical plugging requires tripping the pipe string, of which the procedures are tedious. In case of sand plugging, the plugging tools will be difficult to pull out, increasing the construction risk.

In order to overcome the problems in the development of oil and gas, liquid gel plugs have been studied and developed in recent years and are increasingly being used in oil and gas well operations. Gel temporary plugging well killing fluid is generally known as "liquid gel plug", gel which can form a section of high strength viscoelastic plug in the wellbore based on the principle of high-concentration polymer solution crosslinking in the wellbore. It can be used for well killing operations instead of high density well killing fluid, and can also be used for staged fracturing instead of mechanical bridge plugs, or used for fracturing operations instead of mechanical packers. However, the existing liquid gel plugs still have the problem that the viscosity increases quickly in a short time, which makes it difficult to pump, especially the problem of difficulty in the breaking and degradation of gel. For example, Chinese Patent CN105131917A discloses a degradable liquid gel plug, which needs to pump ammonium persulfate solution into the wellbore for gel breaking after the completion of construction, and the operation procedures are cumbersome. Chinese Patent CN106905940A discloses a medium and high density elastic liquid gel plug and a workover method, in which after the completion of workover, a certain concentration of external force is required to break up the liquid gel plugs into elastic gel plug particles so as to be degraded, and then it is required to circulation flush with brine well killing fluid, the process is complicated.

SUMMARY

In view of this, the present disclosure aims to provide a temperature-responsive self-degradable temporary plugging agent and a preparation method thereof as well as its application in plugging the wellbore. The temporary plugging agent of the present disclosure is liquid before gelling, with a low viscosity and a good fluidity, and easy to be pumped. It has good gelling property and at the end of the operations, it will degrade by itself.

In order to achieve the above objectives, the present disclosure provides the following technical schemes:

The present disclosure provides a temperature-responsive self-degradable temporary plugging agent, which includes preparation raw materials of the following mass percentages:

| | |
|---|---|
| monomer | 4-6%, |
| crosslinker | 0.2-1%, |
| initiator | 0.02-0.06%, |
| degradation catalyst | 0.05-0.1%, |
| chain transfer agent | 0.01-0.05%, |
| water | the balance; |

The monomer is selected from one or more of acrylamide, 2-acrylamido-2-methyl propane sulfonic acid, sodium methallyl sulfonate, methacryloyloxyethyl trimethyl ammonium chloride, sodium p-styrenesulfonate, dimethyl diallyl ammonium chloride, itaconic acid, acrylic acid and maleic anhydride;

The crosslinker is polyethylene glycol (600) diacrylate;

The initiator is selected from one or more of ammonium persulfate, persulfuric acid, potassium persulfate/sodium thiosulfate, ammonium persulfate/sodium bisulfate and azodiisobutylamidine hydrochloride;

The degradation catalyst is 2-amino-2-methyl-1-propanol and/or ethylene glycol amine;

The chain transfer agent is selected from one or more of aliphatic mercaptans, carbon tetrachloride and dithioesters.

Preferably, the temperature-responsive self-degradable temporary plugging agent includes preparation raw materials of the following mass percentages:

| | |
|---|---|
| monomer | 5-6%, |
| crosslinker | 0.2-0.5%, |
| initiator | 0.03-0.06%, |
| degradation catalyst | 0.06-0.08%, |
| chain transfer agent | 0.01-0.03%, |
| water | the balance. |

Preferably, the monomer is acrylamide, sodium methallyl sulfonate or sodium p-styrenesulfonate; the initiator is ammonium persulfate or azodiisobutylamidine hydrochloride; the degradation catalyst is 2-amino-2-methyl-1-propanol or ethylene glycol amine; and the chain transfer agent is an aliphatic mercaptan or carbon tetrachloride.

Preferably, the aliphatic mercaptan is selected from one or more of dodecyl mercaptan, tert-dodecyl mercaptan, methyl mercaptan and 1, 3-dimercaptopropane.

The present disclosure provides a preparation method of the temperature-responsive self-degradable temporary plugging agent in the above technical scheme, which includes the following steps:

Mixing the monomer, crosslinker, initiator, degradation catalyst, chain transfer agent and water to obtain the temperature-responsive self-degradable temporary plugging agent.

The present disclosure provides an application of the temperature-responsive self-degradable temporary plugging agent in the above technical scheme or the temperature-responsive self-degradable temporary plugging agent prepared by the preparation method in the above technical scheme in plugging the wellbore, the application method includes the following steps:

Pumping the temporary plugging agent into the wellbore, displacing the temporary plugging agent by means of a polymer solution into the reservoir section, and the temporary plugging agent crosslinks at the temperature of the reservoir section to form a gel plug for plugging;

After the completion of construction, the gel plug degrades and hydrates by itself, and then flows back out of the wellbore.

Preferably, the temperature of the reservoir section is 50-80° C.

Preferably, the time for crosslinking is 1-5 h.

Preferably, the time for self-degradation and hydration is 3-7 days.

The present disclosure provides a temperature-responsive self-degradable temporary plugging agent, which includes preparation raw materials of the following mass percentages: monomer 4-6%, crosslinker 0.2-1%, initiator 0.02-0.06%, degradation catalyst 0.05-0.1%, chain transfer agent 0.01-0.05%, and the balance water; the monomer is selected from one or more of acrylamide, 2-acrylamido-2-methyl propane sulfonic acid, sodium methallyl sulfonate, methacryloyloxyethyl trimethyl ammonium chloride, sodium p-styrenesulfonate, dimethyl diallyl ammonium chloride, itaconic acid, acrylic acid and maleic anhydride; the crosslinker is polyethylene glycol (600) diacrylate; the initiator is selected from one or more of ammonium persulfate, persulfuric acid, potassium persulfate/sodium thiosulfate, ammonium persulfate/sodium bisulfate and azodiisobutylamidine hydrochloride; the degradation catalyst is 2-amino-2-methyl-1-propanol and/or ethylene glycol amine; the chain transfer agent is selected from one or more of aliphatic mercaptans, carbon tetrachloride and dithioesters. The temporary plugging agent provided in the present disclosure is a temperature-responsive temporary plugging agent, which is liquid before gelling, with a low viscosity and a good fluidity, and easy to be pumped. When being pumped into the wellbore, the temporary plugging agent may crosslink at the temperature of the reservoir section to form a high strength elastic gel plug. As time goes on, the water soluble crosslinking monomer fails to crosslink under the action of the degradation catalyst, and the elastic gel plug degrades into linear polymers with the viscosity reduced. Moreover, the addition of the chain transfer agent reduces the molecular weight, which further reduces the degradation viscosity so that the liquid after gel-breaking is easy to flow back. Therefore, the temporary plugging agent of the present disclosure is easy to be pumped and has good gelling properties; and at the end of the operations, it will degrade by itself, with no need for a drilling tool to be removed, with no need for gel breaking, and with no need for additional degradation promoters. After being degraded, it will have a low viscosity and a good fluidity, with no need for flushing out of the wellbore with clean water, thus reducing the construction difficulty, which is environmental friendly and can be efficiently used in plugging the wellbore.

It is demonstrated from the results of embodiments that, the temporary plugging agent of the present disclosure crosslinks within 1-5 h to form a gel plug, the gelling time is reasonable; the gel can withstand differential pressures above 5 MPa, and the gel strength can maintain 3-4 days, the gelling properties are excellent; degradation and hydration can occur spontaneously within 3-7 days.

The present disclosure also provides a preparation method of the temperature-responsive self-degradable temporary plugging agent, which is simple and easy to operate, and suitable for scale production.

DETAILED DESCRIPTION OF THE EMBODIMENTS

Figure 1:
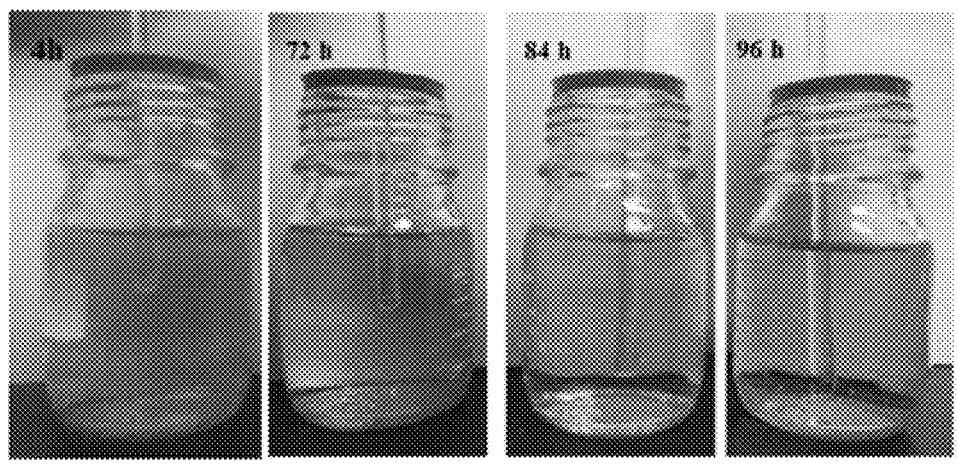
FIG. 1 shows physical images of the strength changes of the temporary plugging agent in embodiment 1 after different gelling times.

The present disclosure provides a temperature-responsive self-degradable temporary plugging agent, which includes preparation raw materials of the following mass percentages:

| | |
|---|---|
| monomer | 4-6%, |
| crosslinker | 0.2-1%, |
| initiator | 0.02-0.06%, |
| degradation catalyst | 0.05-0.1%, |
| chain transfer agent | 0.01-0.05%, |
| water | the balance; |

The monomer is selected from one or more of acrylamide, 2-acrylamido-2-methyl propane sulfonic acid, sodium methallyl sulfonate, methacryloyloxyethyl trimethyl ammonium chloride, sodium p-styrenesulfonate, dimethyl diallyl ammonium chloride, itaconic acid, acrylic acid and maleic anhydride;

The crosslinker is polyethylene glycol (600) diacrylate;

The initiator is selected from one or more of ammonium persulfate, persulfuric acid, potassium persulfate/sodium thiosulfate, ammonium persulfate/sodium bisulfate and azodiisobutylamidine hydrochloride;

The degradation catalyst is 2-amino-2-methyl-1-propanol and/or ethylene glycol amine;

The chain transfer agent is selected from one or more of aliphatic mercaptans, carbon tetrachloride and dithioesters.

On the basis of mass percentages, the temperature-responsive self-degradable temporary plugging agent provided in the present disclosure includes 4-6% of monomer, preferably 5-6%. In the present disclosure, the monomer is selected from one or more of acrylamide, 2-acrylamido-2-methyl propane sulfonic acid, sodium methallyl sulfonate, methacryloyloxyethyl trimethyl ammonium chloride, sodium p-styrenesulfonate, dimethyl diallyl ammonium chloride, itaconic acid, acrylic acid and maleic anhydride. When the monomer is a mixture of several of the above monomers, the present disclosure has no special requirement on the proportion of mixture, and they can be mixed in any proportion. In the embodiments of the present disclosure, the monomer is preferably acrylamide, sodium methallyl sulfonate or sodium p-styrenesulfonate. The present disclosure has no special requirement on the source of the monomer, and any commercial products well known to those skilled in the art can be employed.

On the basis of mass percentages, the temperature-responsive self-degradable temporary plugging agent provided in the present disclosure includes 0.2-1% of crosslinker, preferably 0.2-0.5%. In the present disclosure, the crosslinker is polyethylene glycol (600) diacrylate. The present disclosure has no special requirement on the source of the crosslinker, and any commercial products well known to those skilled in the art can be employed.

On the basis of mass percentages, the temperature-responsive self-degradable temporary plugging agent provided in the present disclosure includes 0.02-0.06% of initiator, preferably 0.03-0.06%. In the present disclosure, the initiator is selected from one or more of ammonium persulfate, persulfuric acid, potassium persulfate/sodium thiosulfate (i.e., a redox initiation system composed of potassium persulfate and sodium thiosulfate, in which the mass ratio of potassium persulfate to sodium thiosulfate is preferably 5:4), ammonium persulfate/sodium bisulfite (i.e., a redox initiation system composed of ammonium persulfate and sodium bisulfite, in which the mass ratio of ammonium persulfate to sodium bisulfite is preferably 5:4) and azodiisobutylamidine hydrochloride. When the initiator is a mixture of several of the above initiators, the present disclosure has no special requirement on the proportion of mixing, and they can be mixed in any proportion. In the embodiments of the present disclosure, the initiator is preferably ammonium persulfate or azodiisobutylamidine hydrochloride. The present disclosure has no special requirement on the source of the initiator, and any commercial products well known to those skilled in the art can be employed.

On the basis of mass percentages, the temperature-responsive self-degradable temporary plugging agent provided in the present disclosure includes 0.05-0.1% of degradation catalyst, preferably 0.06-0.08%. In the present disclosure, the degradation catalyst is 2-amino-2-methyl-1-propanol and/or ethylene glycol amine. In the embodiments of the present disclosure, the degradation catalyst is preferably 2-amino-2-methyl-1-propanol (Model AMP-95) or ethylene glycol amine.

On the basis of mass percentages, the temperature-responsive self-degradable temporary plugging agent provided in the present disclosure includes 0.01-0.05% of chain transfer agent, preferably 0.01-0.03%. In the present disclosure, the chain transfer agent is selected from one or more of aliphatic mercaptans, carbon tetrachloride and dithioesters. When the chain transfer agent is a mixture of several of the above chain transfer agents, the present disclosure has no special requirement on the proportion of mixing, and they can be mixed in any proportion. The present disclosure has no special requirement on the dithioesters, and any dithioesters well known to those skilled in the art can be employed. In the embodiments of the present disclosure, the chain transfer agent is preferably an aliphatic mercaptan or carbon tetrachloride, the aliphatic mercaptan is preferably selected from one or more of dodecyl mercaptan, tert-dodecyl mercaptan, methyl mercaptan and 1,3-dimercaptopropane.

The temperature-responsive self-degradable temporary plugging agent provided in the present disclosure also includes the balance water. The present disclosure has no special requirement on water, and the water well known to those skilled in the art can be employed.

The temporary plugging agent provided in the present disclosure is a temperature-responsive temporary plugging agent, which is liquid before gelling, with a low viscosity and a good fluidity, and easy to be pumped. When being pumped into the wellbore, the temporary plugging agent may crosslink at the temperature of the reservoir section to form a high strength elastic gel plug. As time goes on, the water soluble crosslinking monomer fails to crosslink under the action of the degradation catalyst, and the elastic gel plug degrades into linear polymers with the viscosity reduced. Moreover, the addition of the chain transfer agent reduces the molecular weight, which further reduces the degradation viscosity so that the liquid after gel-breaking is easy to flow back.

The present disclosure provides a preparation method of the temperature-responsive self-degradable temporary plugging agent in the above technical scheme, which includes the following steps:

Mixing the monomer, crosslinker, initiator, degradation catalyst, chain transfer agent and water to get the temperature-responsive self-degradable temporary plugging agent.

In the present disclosure, it is preferable to add the monomer, crosslinker, initiator, degradation catalyst and chain transfer agent into the water for mixing. The present disclosure has no special requirement on the adding sequence of the monomer, crosslinker, initiator, degradation catalyst and the chain transfer agent, and they can be added in any order. The present disclosure has no special requirement on the mixing method, as long as ensuring that each component is well mixed.

The preparation method of the temperature-responsive self-degradable temporary plugging agent provided in the present disclosure is simple and easy to operate, and suitable for scale production.

The present disclosure provides an application of the temperature-responsive self-degradable temporary plugging agent in the above technical scheme or the temperature-responsive self-degradable temporary plugging agent prepared by the preparation method in the above technical scheme in plugging the wellbore, the application method includes the following steps:

Pumping the temporary plugging agent into the wellbore, displacing the temporary plugging agent by means of a polymer solution into the reservoir section, and the temporary plugging agent crosslinks at the temperature of the reservoir section to form a gel plug for plugging;

After the completion of construction, the gel plug degrades and hydrates by itself, and then flows back out of the wellbore.

In the present disclosure, the polymer solution is preferably an aqueous solution of polyacrylamide, the mass concentration of which is preferably 1‰-5‰. In the present disclosure, the temperature of the reservoir section is preferably 50-80° C., more preferably 60-80° C. In the present disclosure, the time for crosslinking is preferably 1-5 h; and the time for self-degradation and hydration is 3-7 days.

The temperature-responsive self-degradable temporary plugging agent and a preparation method thereof as well as its application in plugging the wellbore as provided in the present disclosure will be illustrated in detail below in combination with the following embodiments, which should not be construed as the limitation on the protection scope of the present disclosure.

In each of the embodiments, the crosslinking profiles of the temporary plugging agent at the temperature of the reservoir section were simulated by reacting the temporary plugging agent in a water bath kettle at 60° C.

Embodiment 1

A temperature-responsive degradable temporary plugging agent, of which the preparation method was as below:

20 g acrylamide, 1 g polyethylene glycol (600) diacrylate, 0.125 g ammonium persulfate, 0.25 g AMP-95, 0.05 g tert-dodecyl mercaptan were weighed successively and added into distilled water to formulate a mixed solution of 500 g in a container (a clear glass bottle with lid), getting the temporary plugging agent; the resulting temporary plugging agent is a liquid aqueous solution, the viscosity and density of which were substantially the same as water, thus being easy to be pumped;

The temporary plugging agent was reacted in a water bath kettle at 60° C. for 4 h, getting the gelled temporary plugging agent product.

Glass rods of the same size were inserted into the gelled temporary plugging agent with the same force. The strength after gelling was tested by observing the insertion depth of the glass rods, and the strength changes of the temporary plugging agent after different gelling times were shown in FIG. 1. The temporary plugging agent in this embodiment can gel within 4 h at 60° C. Moreover, it can be known from FIG. 1 that, the strength of the temporary plugging agent would not decrease within 72 h, and it would degrade completely after 96 h.

The gel strength of the temporary plugging agent after different gelling times was characterized by a method of gel strength codes, with the characterization of gel strength codes shown in Table 1 below:

TABLE 1

Characterization of gel strength codes

| Gel Code | Gel Name | Description of corresponding strength |
|---|---|---|
| A | No detectable | The gel appears to have the same viscosity (fluidity) gel as the original polymer solution and no gel is visually detectable. |
| B | Highly flowing gel | The gel appears to be only slightly more viscous than the initial polymer solution. |
| C | Flowing gel | Most of the obviously detectable gel flows to the bottle or ampoule top upon inversion. |
| D | Moderately flowing gel | A small portion (about 5 to 15%) of the gel does not readily flow to the bottle or ampoule top upon inversion. |
| E | Barely flowing gel | The gel can barely flow to the bottle or ampoule top and/or a significant portion (>15%) of the gel does not flow upon inversion. |
| F | Highly deformable nonflowing gel | The gel does not flow to the bottle or ampoule top upon inversion (gel flows to just short of reaching the bottle or ampoule top) |
| G | Moderately deformable nonflowing gel | The gel flows about half way down the bottle or ampoule upon inversion. |
| H | Slightly deformable nonflowing gel | Only the gel surface slightly deforms upon inversion. |
| I | Rigid gel | There is no gel-surface deformation upon inversion; and the gel is stable and clear. |
| J | Ringing rigid gel | A tuning-fork-like mechanical vibration can be felt after tapping the bottle -this code is not used during high-temperature ampoule testing due to use of the safety shield container. |

The gel strength of the temporary plugging agent after different gelling times, e.g., 4 h, 72 h, 84 h, 96 h, is classified into Grade H, Grade E, Grade C, and Grade B.

The breakthrough pressure of temporary plugging agent was tested: the temporary plugging agent was driven into the sand-filling pipe with a permeability of 2248 mD by displacement equipment at a rate of 0.5 mL/min, and then the sand-filling pipe was placed in an oven at 60° C. After gelling, nitrogen was injected reversely to test the breakthrough pressures of the temporary plugging agent, with the testing results shown in FIG. 2.

Figure 2:
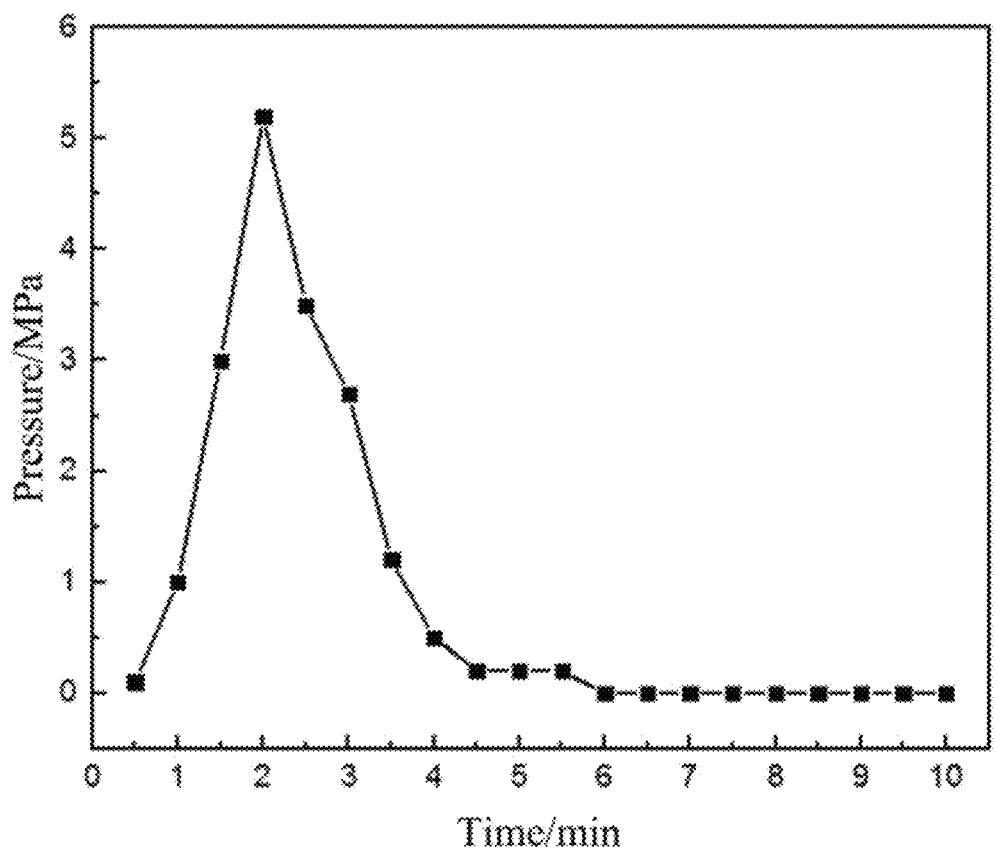
FIG. 2 is a testing graph showing the breakthrough pressures of the temporary plugging agent in embodiment 1.

It can be known from the testing graph of breakthrough pressures in FIG. 2 that, at 2 min, the pressure that the temporary plugging agent can withstand reached the maximum 5.2 MPa, and then the pressure went down all the way to zero, indicating that the temporary plugging agent had a high strength after gelling and could withstand a pressure about 5 MPa; and there was only one breakthrough point for the breakthrough pressures of the temporary plugging agent, indicating that nitrogen broke through after passing the gel, rather than passing through the gap between the gel and the cylinder wall, and also indicating that there was a high bonding force between the gel and the cylinder wall.

Embodiment 2

A temperature-responsive degradable temporary plugging agent, of which the preparation method was as below:

25 g sodium methallyl sulfonate, 1 g polyethylene glycol (600) diacrylate, 0.125 g ammonium persulfate, 0.35 g, 0.3 g, and 0.25 g AMP-95, 0.05 g tert-dodecyl mercaptan were weighed successively and added into distilled water to formulate a mixed solution of 500 g in a container (a clear glass bottle with lid), getting 3 temporary plugging agents;

The above temporary plugging agents were reacted in a water bath kettle at 60° C. for 4 h respectively, getting 3 gelled temporary plugging agent products.

Figure 3:
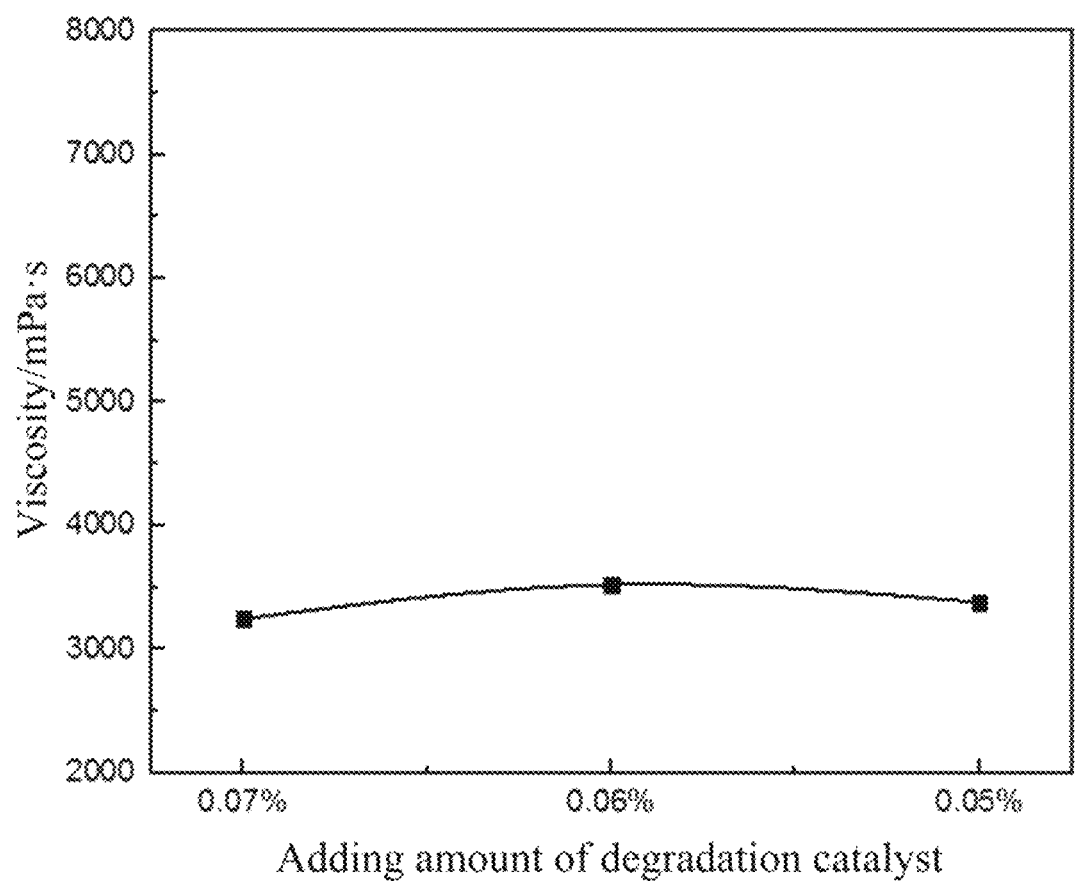
FIG. 3 is a diagram showing the viscosity changes of the temporary plugging agent in embodiment 2 after degradation for 75 h at different adding amounts of degradation catalyst.

The final viscosities of the 3 gelled temporary plugging agent products after degradation for 75 h (with the gelling time point as the starting point of degradation time) were shown in FIG. 3. As can be seen from FIG. 3, after 75 h, as the adding amount of the degradation catalyst decreased from 0.07% to 0.05%, the final degradation viscosities of the temporary plugging agent remained the same substantially, which were all lower than 4000 mPa·s, that was good for liquid flowback after temporary plugging.

Embodiment 3

A temperature-responsive degradable temporary plugging agent, of which the preparation method was as below:

30 g acrylamide, 1.5 g polyethylene glycol (600) diacrylate, 0.3 g azodiisobutylamidine hydrochloride, 0.05 g tert-dodecyl mercaptan, 0.3 g, 0.4 g, and 0.5 g AMP-95 were weighed successively and added into distilled water to formulate a mixed solution of 500 g in a container (a clear glass bottle with lid), getting 3 temporary plugging agents;

The above 3 temporary plugging agents were reacted in a water bath kettle at 60° C. for 4 h respectively, getting 3 gelled temporary plugging agent products.

The effects of different adding amounts of the degradation catalyst (AMP-95) on the performances of the temporary plugging agent were shown in Table 2, in which the degradation time was calculated with the gelling time point as the starting point:

TABLE 2

Effects of different adding amounts of the degradation catalyst on the performance of the temporary plugging agent

| No. | Adding amount of the degradation catalyst | Gelling time | Degradation time | Degradation viscosity |
| --- | --- | --- | --- | --- |
| 1 | 0.06% | 4 h | 6 d | 5324 mPa · s |
| 2 | 0.08% | 4 h | 5 d | 5285 mPa · s |
| 3 | 0.1% | 4 h | 3 d | 5241 mPa · s |

It can be known from Table 2 that, with the increase of the adding amount of the degradation catalyst, the gelling time of the temporary plugging agent was basically kept at about 4 h, but the degradation time decreased as the adding amount increased, and the final viscosity after degradation was about 5000 mPa·s, with little effect on the viscosity. It was demonstrated that the adding amounts of the degradation catalyst only had great effects on the degradation time of the temporary plugging agent, but basically had no effects on other performances of the temporary plugging agent.

TABLE 3

Effects of different adding amounts of the degradation catalyst on the strength and degradation time of the temporary plugging agent

| | Adding amount of the degradation catalyst | Strength of the temporary plugging agent | | | | | | | | | |
| --- | --- | --- | --- | --- | --- | --- | --- | --- | --- | --- | --- |
| | | 0.5 d | 1 d | 2 d | 3 d | 4 d | 5 d | 6 d | 7 d | 8 d | 9 d |
| 1 | 0.06% | H | H | H | H | H | H | F | E | C | A |
| 2 | 0.08% | H | H | H | H | H | F | D | C | A | A |
| 3 | 0.1% | H | H | H | F | E | C | B | A | A | A |

It can be seen from Table 3 that, the gelling strength at different adding amounts of the degradation catalyst reached Grade H, the strength was high. It took about 3-5 days from the beginning of degradation to the completion of degradation, and the strength after the completion of degradation reached Grade A. It was demonstrated that different adding amounts of the degradation catalyst can control the degradation time of the temporary plugging agent, and the adding amount can be adjusted according to the site construction requirements, so it was highly adaptable.

Embodiment 4

A temperature-responsive degradable temporary plugging agent, of which the preparation method was as below:

25 g sodium p-styrenesulfonate, 1 g polyethylene glycol (600) diacrylate, 0.1 g ammonium persulfate, 0.25 g ethylene glycol amine, 0.05 g and 0.1 g carbon tetrachloride were weighed successively and added into distilled water to formulate a mixed solution of 500 g in a container (a clear glass bottle with lid), getting the temporary plugging agents, which were prepared into a solution of the temporary plugging agent of 800 g at the same proportion, respectively;

The above temporary plugging agents were reacted in a water bath kettle at 60° C., getting gelled temporary plugging agent products.

The effects of different adding amounts of the chain transfer agent (carbon tetrachloride) on the performances of the temporary plugging agent were shown in Table 4:

TABLE 4

Effects of different adding amounts of the chain transfer agent on the performances of the temporary plugging agent

| No. | Mass of the temporary plugging agent | Adding amount of the chain transfer agent | Gelling time | Gel strength | Degradation time | Degradation viscosity |
|---|---|---|---|---|---|---|
| 1 | 500 g | 0.01% | 4 h | H | 108 h | 5223 mPa · s |
| 2 | 500 g | 0.02% | 4 h | H | 100 h | 884 mPa · s |
| 3 | 800 g | 0.01% | 5 h | H | 96 h | 6251 mPa · s |
| 4 | 800 g | 0.02% | 5 h | H | 96 h | 1352 mPa · s |

It can be known from Table 4 that, as the adding amount of the chain transfer agent increased from 0.01% to 0.02%, the gelling time and the gel strength were basically not affected, and there was also little effect on the degradation time, while the viscosity after degradation was reduced by about 80%, indicating that the increase of the adding amount of the chain transfer agent has an important role in further reducing the final viscosity of the gel; as the mass of the temporary plugging agent increased from 500 g to 800 g, at the same adding amount of the chain transfer agent, the gelling time both increased by 1 h, and the degradation time was reduced by about 4-12 h, and the final degradation viscosity increased slightly, indicating that the increase of the mass of the temporary plugging agent has a certain effect on the various performances of the gel, but the effects were small, and the test had a good repeatability.

It can be seen from the above embodiments that, the temporary plugging agent of the present disclosure is liquid before gelling, with a low viscosity and a good fluidity, and easy to be pumped; it has good gelling properties and can be degraded by itself.

The foregoing is only preferable implementation of the present disclosure. It should be noted to persons with ordinary skills in the art that several improvements and modifications can be made without deviating from the principle of the present disclosure, which are also considered as the protection scope of the present disclosure.

What is claimed is:

1. A temperature-responsive self-degradable temporary plugging agent comprising preparation raw materials comprising:
   a monomer making up 4-6% mass percent of the preparation raw materials;
   a crosslinker making up 0.2-1% mass percent of the preparation raw materials;
   an initiator making up 0.02-0.06% mass percent of the preparation raw materials;
   a degradation catalyst making up 0.05-0.1% mass percent of the preparation raw materials;
   a chain transfer agent making up 0.01-0.05% mass percent of the preparation raw materials; and
   water making up the remainder of the preparation raw materials,
   wherein the monomer is selected from one or more of acrylamide, 2-acrylamido-2-methyl propane sulfonic acid, sodium methallyl sulfonate, methacryloyloxyethyl trimethyl ammonium chloride, sodium p-styrenesulfonate, dimethyl diallyl ammonium chloride, itaconic acid, acrylic acid, and maleic anhydride,
   wherein the crosslinker is polyethylene glycol (600) diacrylate,
   wherein the initiator is selected from one or more of ammonium persulfate, persulfuric acid, potassium persulfate/sodium thiosulfate, ammonium persulfate/sodium bisulfate, and azodiisobutylamidine hydrochloride,
   wherein the degradation catalyst is 2-amino-2-methyl-1-propanol, ethylene glycol amine, or a combination thereof, and
   wherein the chain transfer agent is selected from one or more of aliphatic mercaptans, carbon tetrachloride, and dithioesters.

2. The temperature-responsive self-degradable temporary plugging agent according to claim 1, wherein:
   the monomer makes up 5-6% mass percent of the preparation raw materials,
   the crosslinker makes up 0.2-0.5% mass percent of the preparation raw materials,
   the initiator makes up 0.03-0.06% mass percent of the preparation raw materials,
   the degradation catalyst makes up 0.06-0.08% mass percent of the preparation raw materials,
   the chain transfer agent makes up 0.01-0.03% mass percent of the preparation raw materials, and
   the water makes up the remainder of the preparation raw materials.

3. The temperature-responsive self-degradable temporary plugging agent according to claim 1, wherein:
   the monomer is acrylamide, sodium methallyl sulfonate, or sodium p-styrenesulfonate,
   the initiator is ammonium persulfate or azodiisobutylamidine hydrochloride,
   the degradation catalyst is 2-amino-2-methyl-1-propanol or ethylene glycol amine, and
   the chain transfer agent is an aliphatic mercaptan or carbon tetrachloride.

4. The temperature-responsive self-degradable temporary plugging agent according to claim 2, wherein:
   the monomer is acrylamide, sodium methallyl sulfonate, or sodium p-styrenesulfonate, the initiator is ammonium persulfate or azodiisobutylamidine hydrochloride,
   the degradation catalyst is 2-amino-2-methyl-1-propanol or ethylene glycol amine, and
   the chain transfer agent is an aliphatic mercaptan or carbon tetrachloride.

5. The temperature-responsive self-degradable temporary plugging agent according to claim 3, wherein the aliphatic mercaptan is selected from one or more of dodecyl mercaptan, tert-dodecyl mercaptan, methyl mercaptan, and 1,3-dimercaptopropane.

6. The temperature-responsive self-degradable temporary plugging agent according to claim 4, wherein the aliphatic mercaptan is selected from one or more of dodecyl mercaptan, tert-dodecyl mercaptan, methyl mercaptan, and 1,3-dimercaptopropane.

7. A preparation method for the temperature-responsive self-degradable temporary plugging agent of claim 1, comprising:
mixing the monomer, crosslinker, initiator, degradation catalyst, chain transfer agent and water to get the temperature-responsive self-degradable temporary plugging agent.

8. The preparation method according to claim 7, wherein:
the monomer makes up 5-6% mass percentage of the preparation raw materials,
the crosslinker makes up 0.2-0.5% mass percentage of the preparation raw materials,
the initiator makes up 0.03-0.06% mass percentage of the preparation raw materials,
the degradation catalyst makes up 0.06-0.08% mass percentage of the preparation raw materials,
the chain transfer agent makes up 0.01-0.03% mass percentage of the preparation raw materials, and
the water makes up the remainder of the preparation raw materials.

9. The preparation method according to claim 7, wherein:
the monomer is acrylamide, sodium methallyl sulfonate, or sodium p-styrenesulfonate,
the initiator is ammonium persulfate or azodiisobutylamidine hydrochloride,
the degradation catalyst is 2-amino-2-methyl-1-propanol or ethylene glycol amine, and
the chain transfer agent is an aliphatic mercaptan or carbon tetrachloride.

10. The preparation method according to claim 9, wherein, the aliphatic mercaptan is selected from one or more of dodecyl mercaptan, tert-dodecyl mercaptan, methyl mercaptan, and 1,3-dimercaptopropane.

11. A method of application of the temperature-responsive self-degradable temporary plugging agent of claim 1 in plugging a wellbore, wherein, the method comprises:
pumping the temporary plugging agent into the wellbore, displacing the temporary plugging agent by means of a polymer solution into the reservoir section, wherein the temporary plugging agent crosslinks at a temperature of the reservoir section to form a gel plug for plugging, and wherein after completion of construction, the gel plug degrades and hydrates by itself, and then flows back out of the wellbore.

12. The application according to claim 11, wherein:
the monomer makes up 5-6% mass percentage of the preparation raw materials,
the crosslinker makes up 0.2-0.5% mass percentage of the preparation raw materials,
the initiator makes up 0.03-0.06% mass percentage of the preparation raw materials,
the degradation catalyst makes up 0.06-0.08% mass percentage of the preparation raw materials,
the chain transfer agent makes up 0.01-0.03% mass percentage of the preparation raw materials, and
the water makes up the remainder of the preparation raw materials.

13. The application according to claim 11, wherein:
the monomer is acrylamide, sodium methallyl sulfonate, or sodium p-styrenesulfonate,
the initiator is ammonium persulfate or azodiisobutylamidine hydrochloride,
the degradation catalyst is 2-amino-2-methyl-1-propanol or ethylene glycol amine, and
the chain transfer agent is an aliphatic mercaptan or carbon tetrachloride.

14. The application according to claim 13, wherein the aliphatic mercaptan is selected from one or more of dodecyl mercaptan, tert-dodecyl mercaptan, methyl mercaptan, and 1,3-dimercaptopropane.

15. The application according to claim 11, wherein the temperature of the reservoir section is 50-80° C.

16. The application according to claim 11, wherein the time for crosslinking is 1-5 h.

17. The application according to claim 11, wherein the time for self-degradation and hydration is 3-7 days.

* * * * *